(12) United States Patent
Wolkersdorfer

(10) Patent No.: US 8,007,037 B2
(45) Date of Patent: Aug. 30, 2011

(54) MOTOR VEHICLE

(75) Inventor: Werner Wolkersdorfer, Neuhausen (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 189 days.

(21) Appl. No.: 12/331,729

(22) Filed: Dec. 10, 2008

(65) Prior Publication Data

US 2009/0189417 A1 Jul. 30, 2009

(30) Foreign Application Priority Data

Jan. 25, 2008 (DE) .................. 10 2008 006 103

(51) Int. Cl.
*B62D 35/00* (2006.01)
(52) U.S. Cl. .............. 296/209; 296/193.05; 296/208
(58) Field of Classification Search ........... 296/180.1, 296/180.3, 180.5, 187.11, 193.05, 203.03, 296/203.05, 209, 208; 454/162, 163, 164, 454/165
See application file for complete search history.

(56) References Cited

U.S. PATENT DOCUMENTS

| | | | | |
|---|---|---|---|---|
| 2,189,406 | A * | 2/1940 | Roberts | 454/163 |
| 2,514,695 | A * | 7/1950 | Dempsey | 296/208 |
| 2,724,556 | A * | 11/1955 | Brubaker et al. | 237/12.3 R |
| 3,529,862 | A * | 9/1970 | Jousserandot | 296/180.1 |
| 3,563,598 | A * | 2/1971 | Wilfert et al. | 296/208 |
| 4,549,762 | A * | 10/1985 | Burk et al. | 296/208 |
| 4,607,878 | A * | 8/1986 | Itoh | 296/199 |
| 4,838,603 | A * | 6/1989 | Masoero et al. | 296/180.1 |
| 5,184,832 | A * | 2/1993 | Miwa | 296/198 |
| D356,757 | S | 3/1995 | Lagaay et al. | |
| 5,412,024 | A * | 5/1995 | Okada et al. | 524/577 |
| 5,533,779 | A * | 7/1996 | Epple et al. | 296/192 |
| D449,254 | S | 10/2001 | Larson | |
| 6,354,003 | B1 * | 3/2002 | Lehmann et al. | 29/897.2 |
| 2005/0133287 | A1 | 6/2005 | Schmid et al. | |
| 2007/0216199 | A1 * | 9/2007 | Ito et al. | 296/198 |

FOREIGN PATENT DOCUMENTS

| | | |
|---|---|---|
| DE | 100 47 731 A1 | 4/2002 |
| DE | 103 09 634 A1 | 9/2004 |
| DE | 103 59 769 B3 | 9/2005 |
| DE | 102004024338 A1 | 12/2005 |
| DE | 102005048295 A1 | 4/2007 |

OTHER PUBLICATIONS

German Search Report dated Feb. 17, 2009.

* cited by examiner

*Primary Examiner* — Glenn Dayoan
*Assistant Examiner* — Pinel E Romain

(57) ABSTRACT

A motor vehicle, preferably a two door sports car, is provided with a side wall section, in particular comprising a fender, which forms at least partially the outer wall of a wheel housing. A sill panel which covers a lateral sill of the motor vehicle in the connected state to the side wall section forms an outer wall of an air guiding channel.

6 Claims, 4 Drawing Sheets

MOTOR VEHICLE

CROSS-REFERENCE TO RELATED APPLICATIONS

This application claims priority to German Patent Application No. 10 2008 006103.4, filed Jan. 25, 2008, the entire disclosure of which is expressly incorporated by reference herein.

FIELD OF THE INVENTION

The present invention relates to a motor vehicle, in particular a two door sports car. In addition, the invention relates to a sill panel for a vehicle of this type.

German Patent Publication No. DE 100 47 731 A1 discloses a side wall for a passenger motor vehicle, in particular for one of the class of sports cars, wherein the front and rear sections of the side wall form the outer wall forming the wheel housing for a front wheel and a rear wheel. In order to improve an engine mounted in a rear area of the passenger motor vehicle, an air guiding device is provided with an air feed system, which is an essential part of the side wall in front of the wheel housing of the rear wheel. In this case a wall section, which is located between the air guiding device and the air feed system and is a part of the side wall, is configured as the air guiding channel.

U.S. Design No. 356,757 discloses a motor vehicle, wherein a bottom and front (as viewed in the direction of motion) area of a rear wheel housing exhibits an air inlet port, which is integrated in the wheel housing. In this case the air inlet port and the adjoining air guiding channel are designed in the fender.

German Patent Publication No. DE 103 09 634 A1 discloses a rear fender of a motor vehicle. This fender is constructed of multiple parts. In this case the fender forms together with a shaped part, which can be connected to the fender, an air guiding channel.

U.S. Design Pat. No. 449,254 in turn discloses a motor vehicle which exhibits a lateral air inlet in the area of a rear fender. In this case an outer wall of the air inlet is formed by the fender itself.

Finally German Patent Publication No. DE 103 59 769 B3 discloses an air supply channel for a cooler of a motor vehicle. In this case a lateral air inlet of the air supply channel is arranged in the direction of travel in front of a rear wheel housing of the motor vehicle. Therefore, an outer wall of the air guiding channel is formed by the fender.

BACKGROUND OF THE INVENTION

The present invention deals with the problem of providing an improved design for a motor vehicle of the type conforming with this genre. The design is characterized, in particular, by a flexible construction of a lateral air guiding channel.

The invention is based on the general idea of modifying a lateral trim strip, that is, a sill panel, in order to cover the lateral sill in such a way with respect to its shape that this sill panel forms together with a side wall section of a motor vehicle an air guiding channel. In this case the motor vehicle, which can be constructed, in particular, as a two door sports car, exhibits said side wall section with a fender, which forms at least partially the outer wall of a wheel housing. The sill panel, which usually covers the lateral sill, which is mounted on a level with the vehicle floor, is pulled upwards at least at one of its longitudinal ends and covers with this upwardly sweeping area the side wall section, which is pulled inwards, in particular, in this area, so that in the connected state to the side wall section the sill panel forms at least one outer wall of the air guiding channel, whereas the side wall section itself forms an inner wall of the air guiding channel. The upwardly sweeping area of the sill panel can also form the outer wall and the inner wall of the air guiding channel. Owing to the circumstance that at least the outer wall of the air guiding channel is formed by the sill panel, the result is a largely free and unrestricted stylistic design option for a designer. Hence, especially in the event of a change in model, a so-called "face lift" can be easily achieved by redesigning the sill panel. In addition, the inventive sill panel makes it possible to dispense with a PVC coating, which is usually applied to the sill, and/or an anti-stone chip foil, as a result of which the production costs can be cut. In the design, according to the invention, the stone chip guard can be taken over by the sill panel.

SUMMARY OF THE INVENTION

It is desirable to make the sill panel of a synthetic plastic material. A sill panel that is made of a synthetic plastic material offers, on the one hand, the major advantage of providing a weight-optimized solution for forming the air guiding channel and, on the other hand, providing a flexible manipulation of the shape of the sill panel. A sill panel that is made of a synthetic plastic material can be redesigned easily and economically, especially in the event of a "face lift," by using a new extrusion die, as a result of which the retrofitting costs of such a "face lift" can be reduced. However, in particular the sports car design benefits from the chief advantage of an easy to manufacture sill panel of this type, as a result of which the weight and, thus, also the fuel consumption of the motor vehicle can be reduced.

It is desirable for the sill panel to exhibit tabs in the area of the air guiding channel. Hence, the sill panel is supported at the side wall section by means of these tabs. Such tabs, which may also be designed, according to a special embodiment, as flow guiding elements, can be molded on the sill panel in situations in which the sill panel is made of a synthetic plastic material. Furthermore, such tabs can be produced, in particular, with a suitably designed extrusion die, together (that is, in one single working step) with the sill panel. The tabs can also be produced separately and subsequently connected to the upwardly sweeping area of the panel sill.

In an additional advantageous embodiment of the inventive solution, the air guiding channel, which is formed by the side wall section and the sill panel, in the area in front of the wheel housing of a rear wheel and/or in the area behind the wheel housing of a front wheel empties into the environment and, in so doing, forms an air inlet and/or an air outlet. Thus, it becomes clear that the sill panel is pulled upwards at both of its two longitudinal ends or just at one longitudinal end, preferably at a rear (as viewed in the direction of travel) longitudinal end, and forms with this upwardly sweeping area the outer wall of the air guiding channel. In this case it is conceivable that a wide range of vehicle lines and/or vehicle variants can be realized with different sill panels and the associated side wall sections, so that a wide range of vehicle designs can be produced with such a modular system comprising a variety of sill panels and side wall sections.

It is self-evident that the aforementioned features and those features that will be explained below may be applied not only in the respectively specified combination, but also in other combinations or alone by themselves without departing from the scope of the present invention.

Preferred embodiments of the invention are depicted in the drawings and are explained in detail in the following descrip-

DETAILED DESCRIPTION

Figure 1:
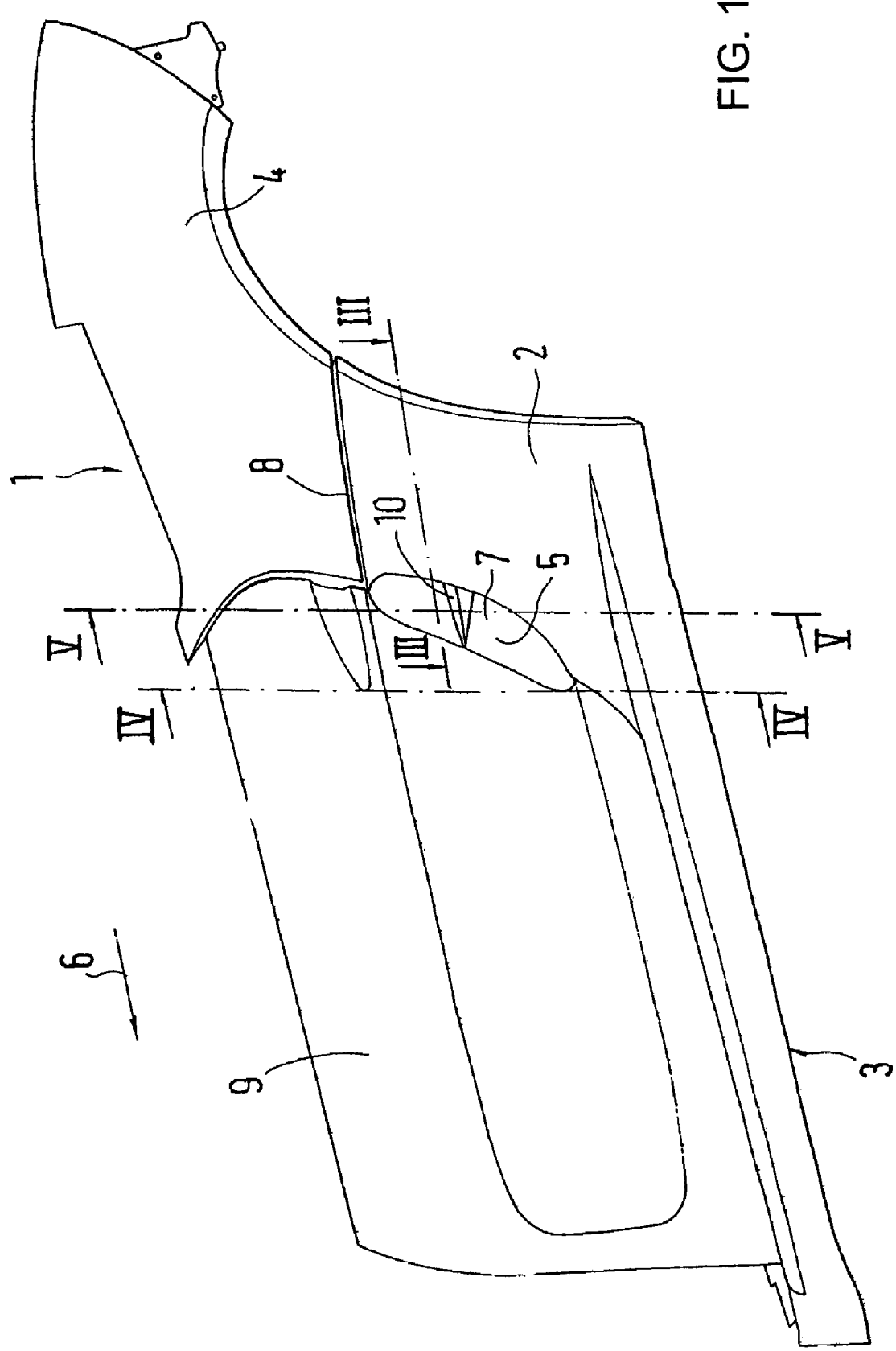
FIG. 1 is a schematic drawing of a top view of an inventive side wall section with a sill panel of a motor vehicle in accordance with an embodiment of the present invention.
Figure 2:
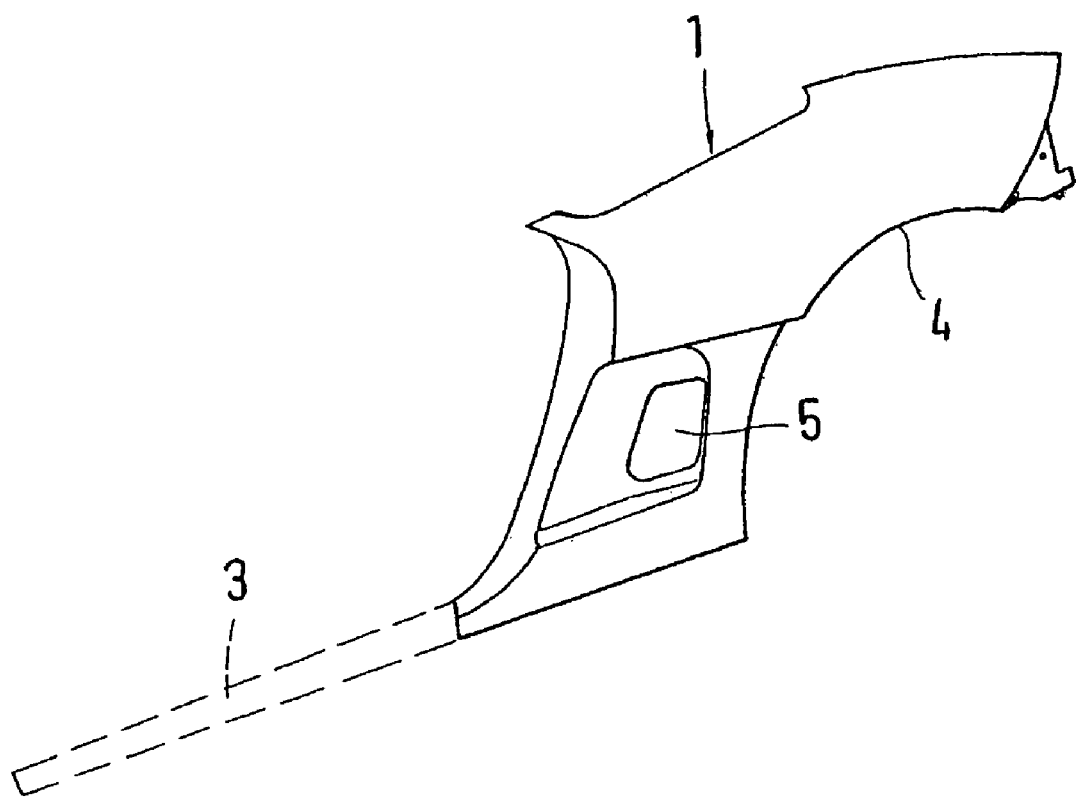
FIG. 2 is a schematic drawing of an enlarged view of the side wall section and the sill panel of FIG. 1.
Figure 2:
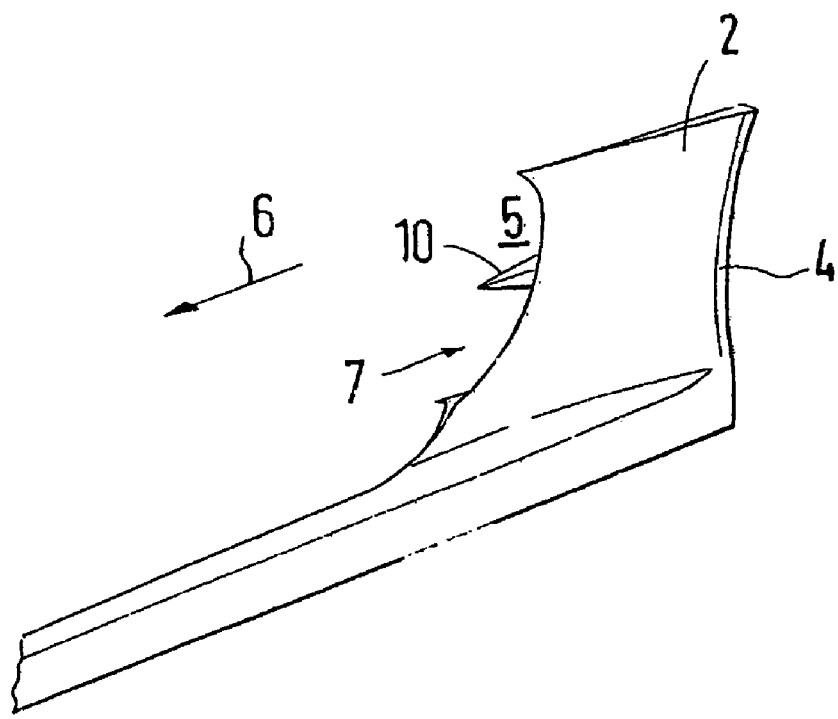

According to FIG. 1, a side wall section 1 of a motor vehicle, which is otherwise not shown and which may be designed, for example, as a two door sports car, exhibits a sill panel 2 for covering a lateral sill 3 (cf. FIG. 2 top drawing). At the same time the side wall section 1 forms at least partially the outer wall of a wheel housing 4, in the example, illustrated in FIG. 1, of a wheel housing 4 of a rear wheel. In the case of a motor vehicle, designed as a sports car, a drive motor is often mounted in a rear area of the said sports car and can be supplied additionally with cooling air by means of air guiding channels 5 in order to facilitate cooling. In the example, shown in FIG. 1, the air guiding channel 5 empties, as viewed in the direction of travel 6, in front of the rear wheel housing 4, so that this motor vehicle has a lateral air inlet 7. In order to be able to configure the air inlet 7 and, thus, the visual design of the motor vehicle in an extremely flexible way, that is, freely, the invention provides that in the connected state to the side wall section 1, the sill panel 2 forms at least one outer wall of the air guiding channel 5. At the same time the air guiding channel 5, which is formed, as depicted in FIG. 1, by the side wall section 1 and the sill panel 2, in the area in front of the wheel housing 4 of a rear wheel and/or—as not illustrated—in the area behind the wheel housing of a front wheel empties into the environment and forms thereby the air inlet 7 and/or an air outlet. The latter variant is intended especially for sports cars, where the drive system is mounted in a front area.

Furthermore, FIG. 1 shows that the sill panel 2 is pulled upwards in its rear (as viewed in the direction of travel 6) area and forms exclusively in this upwardly sweeping area at least the outer wall of the air guiding channel 5, whereas the side wall section 1 in this area forms an inner wall of the air guiding channel 5. The upwardly sweeping area of the sill panel 2 can also form the outer wall and the inner wall of the air guiding channel 5. Hence, the inventive sill panel 2 is significantly larger than the conventional sill panels and also assumes, in addition to the protective function of the sill 3, the function of defining the air guiding channel 5 at least in certain places.

In order to integrate the sill panel 2 into the outer contour of the motor vehicle in a way that is as appealing as possible from a designer's viewpoint, this sill panel can run in the area of the air guiding channel 5 flush with the outer wall, which forms the wheel housing 4 and is part of the side wall section 1. In the specific case this means that the sill panel 2 in the area of a joint 8 passes over into the side wall section flush, that is, in alignment, with this side wall section 1. In order to be able to realize this flush transition between the side wall section 1 and the sill panel 2 in the area of the joint 8 and simultaneously to be able to form the air guiding channel 5 by means of the side wall section 1 and the sill panel 2, the side wall section 1 may be pulled inwards in the area of the air guiding channel 5. At the same time this inwardly pulled area of the side wall section 1 can have its continuation in a vehicle door 9 as depicted in FIG. 1.

In order to be able to manufacture the sill panel 2, on the one hand, economically, and, on the other hand, with a high degree of design freedom, this sill panel is made preferably of a synthetic plastic material and manufactured by the injection molded process. This method allows the sill panel 2 to be easily adapted, insofar as this sill panel is supposed to be modified, for example, in a so-called "face lift."

FIG. 1 and, in particular, the bottom drawing in FIG. 2 show that the sill panel 2 in the area of the air guiding channel 5 exhibits at least one tab 10, by means of which the sill panel is supported at the side wall section 1 and which may serve simultaneously to reinforce the sill panel 2. In addition, it is, of course, conceivable that the tab 10 is designed as a flow guiding element and, in so doing, generates a flow guiding effect in the air guiding channel 5. In this case the at least one tab 10 can be manufactured in one working step, that is, together with the sill panel 2 or also separately.

Figure 3:
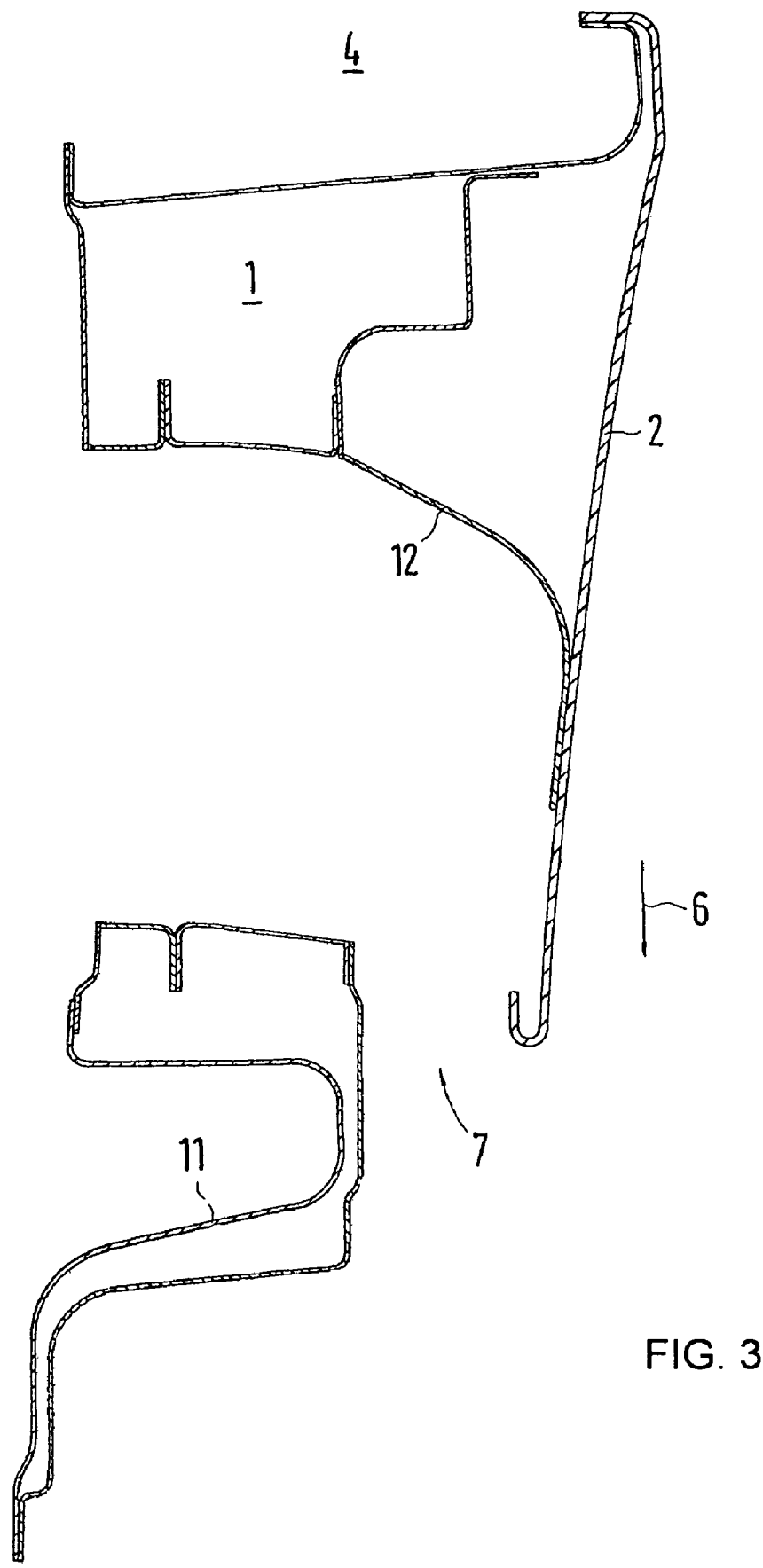
FIG. 3 is a schematic drawing of a horizontal view of the inventive side wall section of FIG. 1 along the cut plane III-III.

If one were to look at FIG. 3, it would be clear that the sill panel 2 in the area of the air inlet 7 is designed so as to be bent, as a consequence of which the flow properties can be positively influenced at the air inlet 7. The sill panel 2 is connected to the side wall section 1, for example, by at least one screw and/or clip connection, which is not illustrated. The side wall section 1 may also outwardly cover, as depicted in FIG. 3, a B pillar 11. Similarly there may also be an air guiding element 12, for example, an air guide vane, which influences and/or directs the air flow, entering into the air guiding channel 5 by way of the air inlet 7, with respect to the flow direction of said air flow. This air guiding element 12 can be designed as a separate component or as an essential part of the side wall section 1 and/or the sill panel 2.

Furthermore, it is evident from FIG. 3 that the sill panel 2 in the area of the wheel housing 4 covers the side wall section 1 in the direction of the vehicle wheel and, in so doing, protects said side wall section from the impact of stones.

Figure 4:
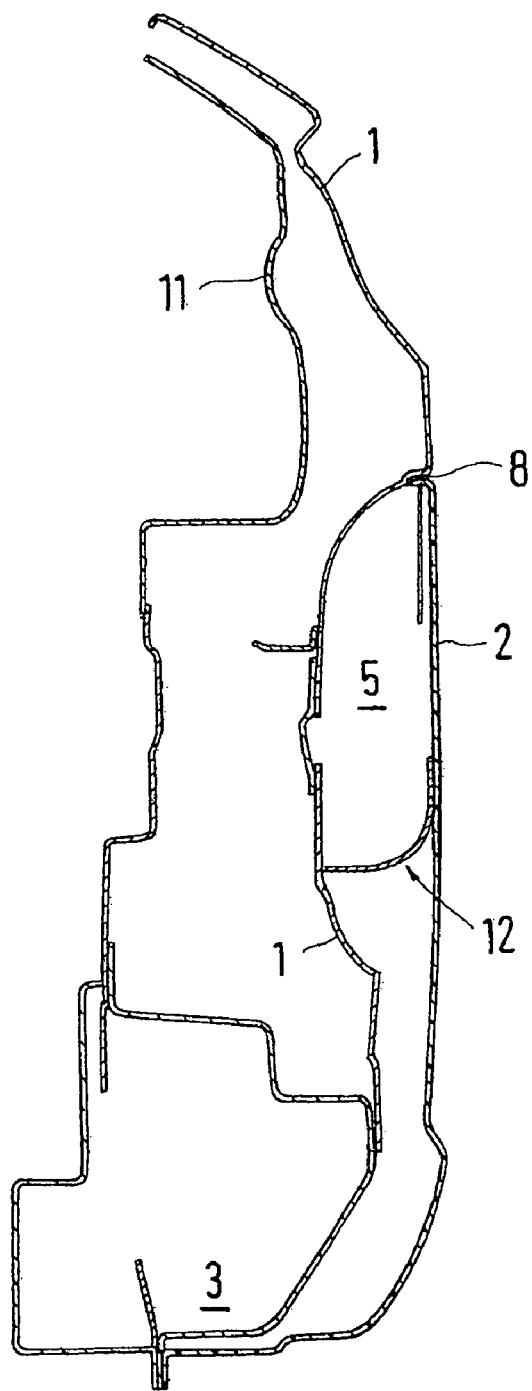
FIG. 4 is a schematic drawing of a vertical view of the inventive side wall section of FIG. 1 along the cut plane IV-IV.
Figure 5:
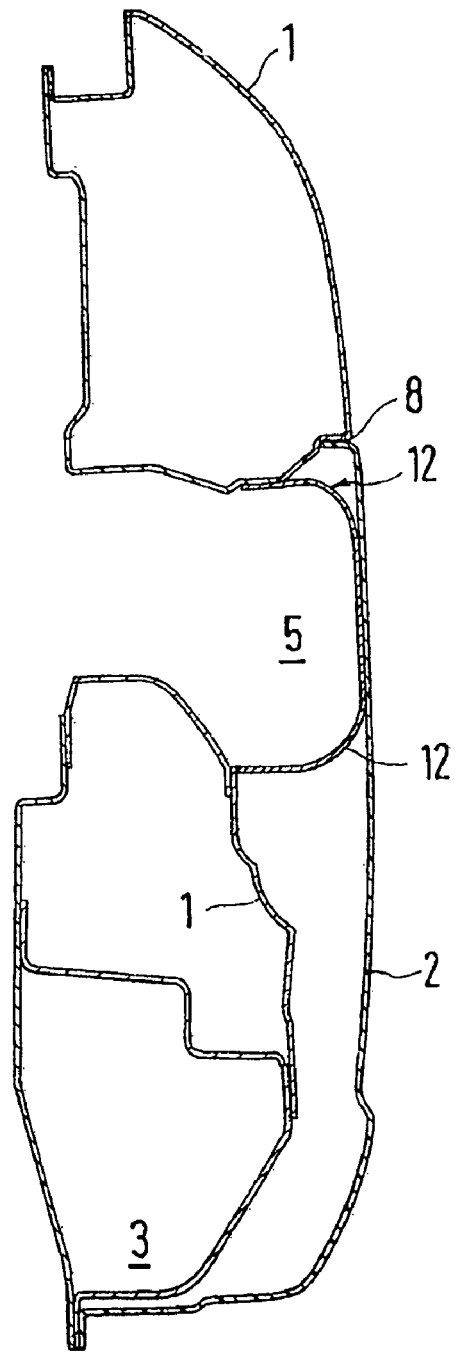
FIG. 5 is a schematic drawing of a vertical view of the inventive side wall section of FIG. 1 along the cut plane V-V.

FIGS. 4 and 5 show clearly that the sill panel 2 covers the sill 3 not only in the direction of the side, but also in the downward direction so that the sill is preferably totally protected by the sill panel 2, which covers the sill, against the impact of a stone. Similarly FIGS. 4 and 5 illustrate the exemplary air guiding elements 12, which reroute the air flow, incoming into the air guiding channel 5 by way of the air inlet 7 counter to the direction of travel 6, thus according to FIGS. 4 and 5, perpendicularly into the plane of the image, in the direction of the internal combustion engine, mounted in the rear area of the motor vehicle. In particular, FIG. 5 shows that in this case it may be provided in a rear area (as viewed in the direction of travel) of the air guiding channel 5 that such an air guiding element 12 forms the outer wall of the air guiding channel 5.

The inventive sill panel 2, which forms together with the side wall section 1 of the motor vehicle the wall of an air guiding channel 5, makes it possible to achieve the following advantages:

largely free and unrestricted design options from a designer viewpoint, in particular with respect to the sill panel 2, which is made of a synthetic plastic material, a reduction in weight owing to at least the partial absence of a sill shape in the side wall section, reduction in parts redundancy owing to the integration of components, like an air guiding element 12, swirl plates, fins, etc.

the potential elimination of a PVC coating of the sill 3, the potential elimination of an anti-stone chip coating, in particular an anti-stone chip foil for the sill 3.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A motor vehicle, comprising:
   a side wall forming a fender, the fender forming at least a portion of an outer wall of a wheel housing;
   a lateral sill;
   a sill panel, the sill panel covering at least a portion of the lateral sill and forming at least one outer wall of an air guiding channel formed partially in the side wall, the sill panel being pulled upwards at least in certain places defining an upwardly sweeping area and forms in the upwardly sweeping area the outer wall of the air guiding channel, the sill panel being formed from a synthetic plastic material, and in an area of the air guiding channel, the sill panel having at least one tab disposed to support the sill panel at the side wall section;
   the side wall having a side wall section opposite the upwardly sweeping area forming an inner wall of the air guiding channel; and
   the side wall section in an area of the air guiding channel being pulled inwards toward a longitudinal center line of the motor vehicle.

2. The motor vehicle claimed in claim 1, wherein in an area in front of a rear wheel, the air guiding channel formed by the side wall section and the sill panel empties into the environment and, in so doing, forms at least one of an air inlet and an air outlet.

3. The motor vehicle claimed in claim 1, wherein the sill panel in the area of the air guiding channel runs flush with the outer wall, which forms the wheel housing and is part of the side wall section.

4. The motor vehicle, as claimed in claim 1, wherein the pulled-in area of the side wall section for forming the air guiding channel continues in a vehicle door.

5. The motor vehicle claimed in claim 1, wherein the at least one tab is designed as a flow guiding element.

6. A side wall for a motor vehicle, comprising:
   a fender, the fender forming at least a portion of an outer wall of a wheel housing; and
   a lateral sill;
   a sill panel, the sill panel covering at least a portion of the lateral sill and forming at least one outer wall of an air guiding channel formed at least partially in the fender, the sill panel being pulled upwards at least in certain places defining an upwardly sweeping area and forms in the upwardly sweeping area the outer wall of the air guiding channel, the sill panel being formed from a synthetic plastic material, and in an area of the air guiding channel, the sill panel having at least one tab disposed to support the sill panel at the side wall section; and
   the fender having a side wall section disposed opposite the upwardly sweeping area and forming an inner wall of the air guiding channel, the side wall section in an area of the air guiding channel being pulled inwards toward a longitudinal center line of the motor vehicle.

* * * * *